United States Patent
Ozaki (10) Patent No.: US 7,174,739 B2
(45) Date of Patent: Feb. 13, 2007

(54) AIR CHILLER UNIT

(75) Inventor: Masaji Ozaki, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/974,749

(22) Filed: Oct. 28, 2004

(65) Prior Publication Data

US 2005/0092008 A1  May 5, 2005

(30) Foreign Application Priority Data

Oct. 29, 2003  (JP) .............................. 2003-368299

(51) Int. Cl.
*F25D 21/14* (2006.01)
*F16K 15/14* (2006.01)

(52) U.S. Cl. ............................ 62/285; 62/286; 62/287; 62/288; 62/289; 62/290; 62/291; 137/859

(58) Field of Classification Search .......... 62/285–291; 137/859

See application file for complete search history.

(56) References Cited

U.S. PATENT DOCUMENTS

| | | | |
|---|---|---|---|
| 3,567,023 A | | 3/1971 | Buckman et al. |
| 3,845,779 A | * | 11/1974 | Greene, Jr. .................. 137/209 |
| 4,361,014 A | | 11/1982 | Blain et al. |
| 4,843,835 A | * | 7/1989 | Goetz et al. .................. 62/285 |
| 5,295,531 A | * | 3/1994 | Tsunekawa et al. ........ 165/48.1 |
| 5,491,979 A | | 2/1996 | Kull et al. |
| 5,513,500 A | | 5/1996 | Fischer et al. |
| 5,797,426 A | * | 8/1998 | Powell ................... 137/533.11 |
| 6,301,917 B1 | * | 10/2001 | Lacoste ........................ 62/286 |
| 6,334,761 B1 | * | 1/2002 | Tai et al. .................. 417/413.3 |
| 6,698,225 B2 | * | 3/2004 | Chaves ........................ 62/285 |
| 2003/0037561 A1 | | 2/2003 | Chaves |

FOREIGN PATENT DOCUMENTS

FR    2820196 A    8/2002

OTHER PUBLICATIONS

European Search Report, dated Aug. 31, 2006, issued in corresponding European Application No. 04 02 5444.

* cited by examiner

*Primary Examiner*—Cheryl Tyler
*Assistant Examiner*—B Clayton McCraw
(74) *Attorney, Agent, or Firm*—Westerman, Hattori, Daniels & Adrian, LLP.

(57) ABSTRACT

The invention provides an improved drain valve for dew condensation in an air chiller unit mounted on an aircraft. The drain valve 160 attached to a drain of a drain pan in an air chiller unit is equipped with a valve seat member 162 having an opening 162a at the center and a valve member 164 disposed to contact the lower surface of the valve seat member 162. The valve member 164 is made of thin silicon rubber, and arms 164b created by slits formed thereto support a valve means 164e with extremely small spring constant. While the air chiller unit is operating, the valve means 164e is air tightly attached to the opening 162a of the valve seat by negative pressure, closing the drain valve. When the operation stops and dew drops gather on the valve means 164e, the valve means 164e is displaced by the weight and the valve is opened. When there are no dew drops, the valve is closed to prevent moisture from entering.

2 Claims, 10 Drawing Sheets

AIR CHILLER UNIT

The present application is based on and claims priority of Japanese patent application No. 2003-368299 filed on Oct. 29, 2003, the entire contents of which are hereby incorporated by reference.

FIELD OF THE INVENTION

The present invention relates to an air chiller unit (air cooling device) equipped within a body of an aircraft, for supplying cooled air to foods or the like.

DESCRIPTION OF THE RELATED ART

Passenger aircrafts that travel long distances, such as international flights, are equipped with service carts storing meals etc. to be served to passengers, and galleys (kitchen areas) storing the service carts for preparing beverages and doing easy food preparation.

The meals are cooked in advance in service facilities on the ground, placed on trays to be stored in service carts, and brought on board.

Of the meals placed on the trays, warm dishes are heated by a heater etc., and cold dishes such as salads are maintained at low temperature by feeding cooled air into the service carts.

The following patent document discloses an example of a device for cooling service carts.

Patent Document 1: U.S. Pat. No. 5,491,979

Since the air chiller unit is equipped with an evaporator for heat exchange disposed within a refrigeration cycle unit, dew condensation tends to occur on the surface of the evaporator.

When the refrigeration cycle unit is stopped, the dew condensation drips from the evaporator in forms of water drops. The water drops are received by a drain pan, and discharged through a drain.

The noise generated inside the air chiller unit is leaked through the drain to the passenger cabin, and highly moist outside air enters the air chiller unit through the drain, causing further dew condensation.

SUMMARY OF THE INVENTION

The present invention provides an air chiller unit equipped with a drain valve that automatically opens and closes according to the operation status of the air chiller unit.

The air chiller unit according to the present invention includes a refrigeration cycle unit, a casing for storing the refrigeration cycle unit, a drain pan for receiving the dew condensation on an evaporator in the refrigeration cycle unit, and a drain valve disposed on a drain of the drain pan. The drain valve is equipped with a ring-shaped valve seat member having an opening at the center thereof, and a valve member disposed underneath the valve seat member for opening and closing the opening of the valve seat member. Further, the valve member is made of a thin silicon rubber material, and the valve means for opening and closing the opening of the valve seat member is designed to contact the opening of the valve seat member with a small spring constant.

As described, the present air chiller unit is equipped with a drain valve disposed on the drain of the drain pan for receiving water drops condensed on the evaporator in the refrigeration cycle unit, and discharges the water only when water exists. During the time the interior of the device is maintained at negative pressure by the operation of the fan, the valve is closed to prevent outside moisture from entering.

Thus, dew condensation can be reduced, and the number of times for dehumidifying the device can be reduced.

Moreover, during operation of the air chiller unit, the drain valve is closed due to negative pressure, preventing noise from leaking.

DETAILED DESCRIPTION OF THE PREFERRED EMBODIMENT

Figure 1:
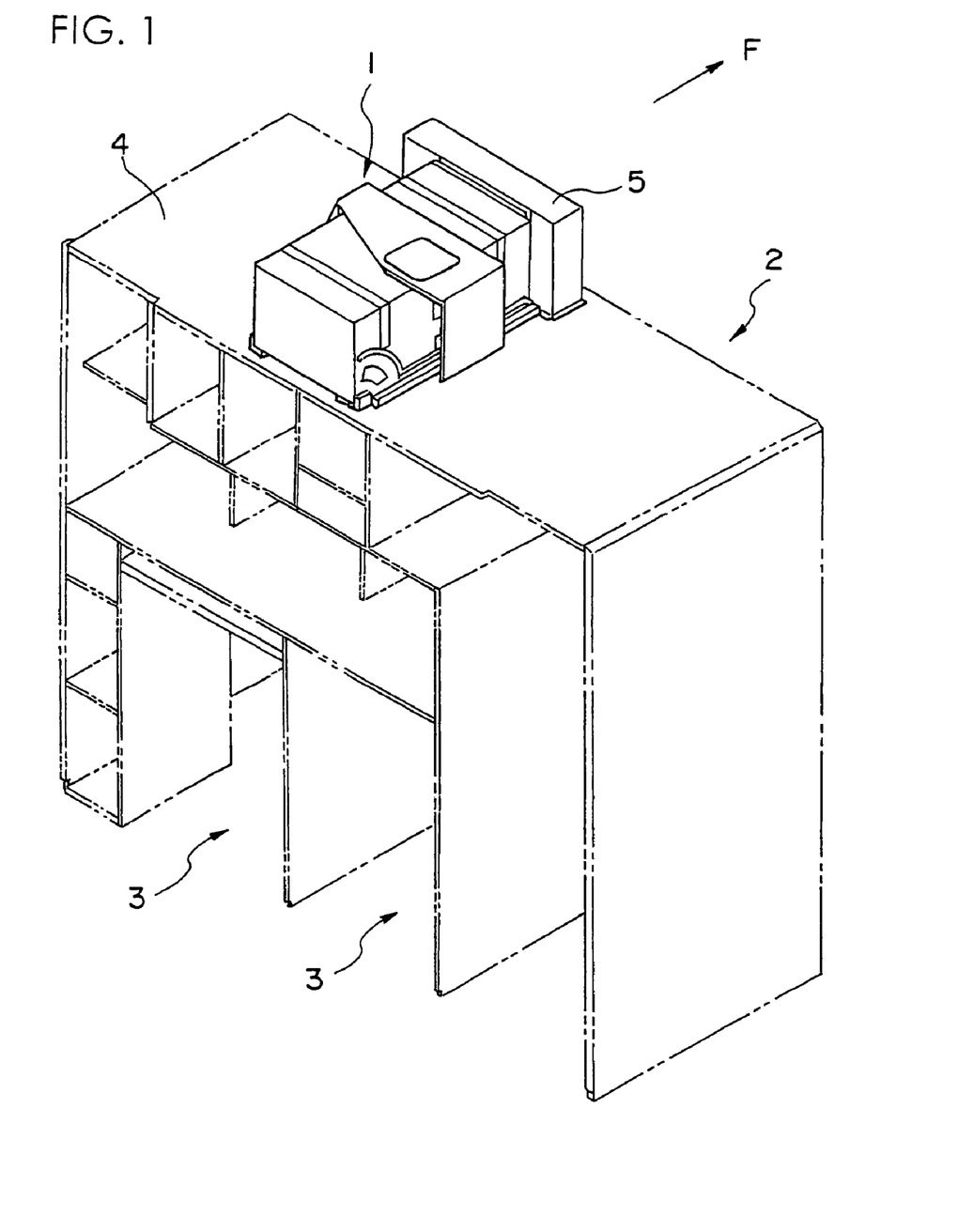
FIG. 1 is an explanatory view showing the general structure of the galley.

FIG. 1 is an explanatory view showing the general structure of a galley equipped with an air chiller unit according to the present invention.

The galley denoted as a whole by reference number 2 is formed of panel members, and equipped with multiple shelves and storages for storing cooking devices and the like.

Storage spaces 3 provided on the floor of the galley 2 are for storing service carts (not shown) storing trays for meals.

Above a ceiling 4 of the galley 2 is attached an air chiller unit 1. The air chiller unit 1 is not exposed to the cabin, and is arranged in the ceiling of the aircraft.

Arrow F of FIG. 1 shows the front direction of the aircraft body, and a passage for cooled air for cooling the service cart is formed on the back side of the galley 2 positioned at the forward direction of the aircraft body.

The cool air circulated within the galley is recycled to the air chiller unit 1, where it is cooled to predetermined temperature and sent out into the galley again.

A duct device 5 connected to the air chiller unit 1 is equipped with a passage returning from the interior of the galley and a passage for sending freshly cooled air toward the galley.

Figure 2:
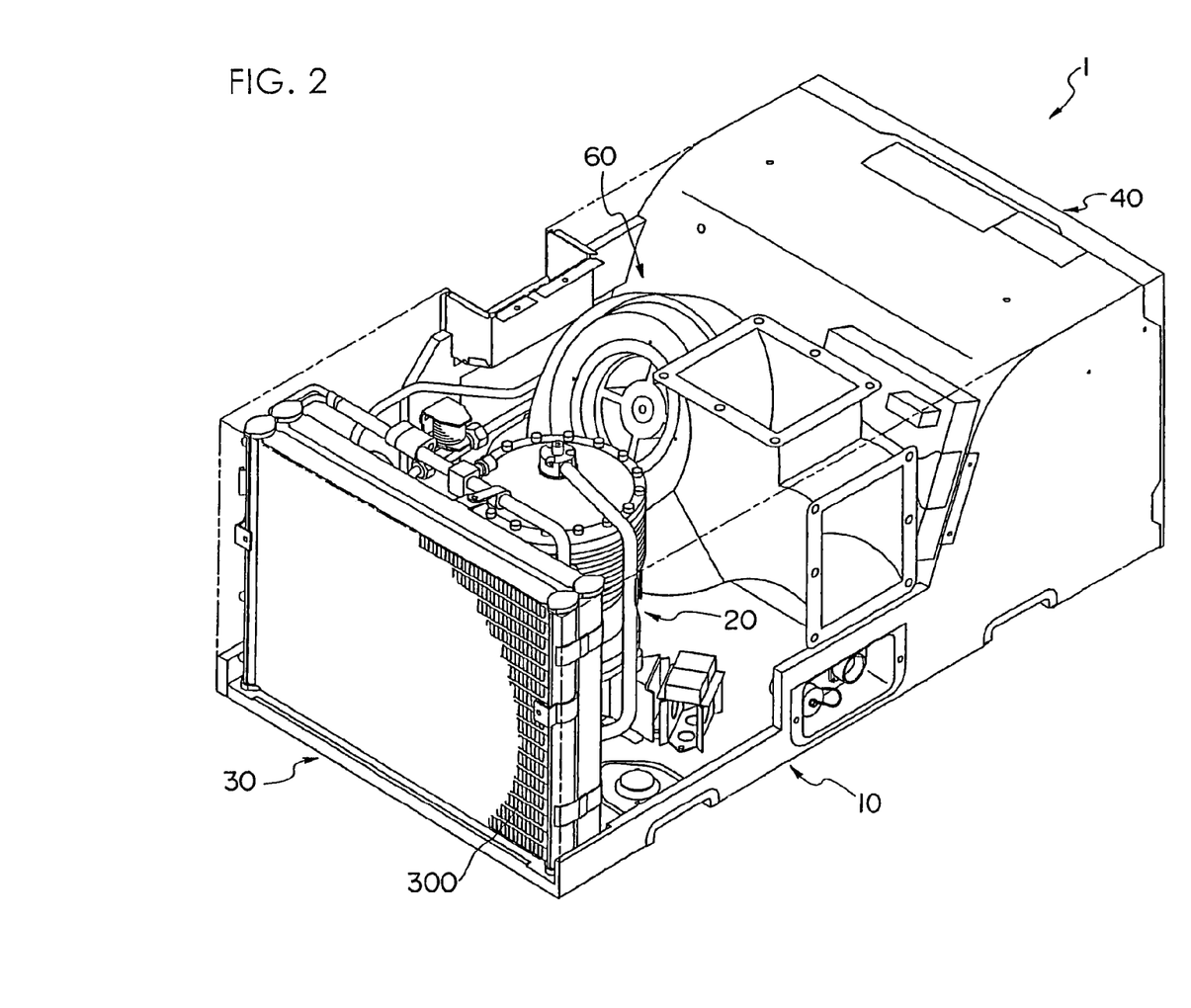
FIG. 2 is an explanatory view of an air chiller unit according to the present invention.
Figure 3:
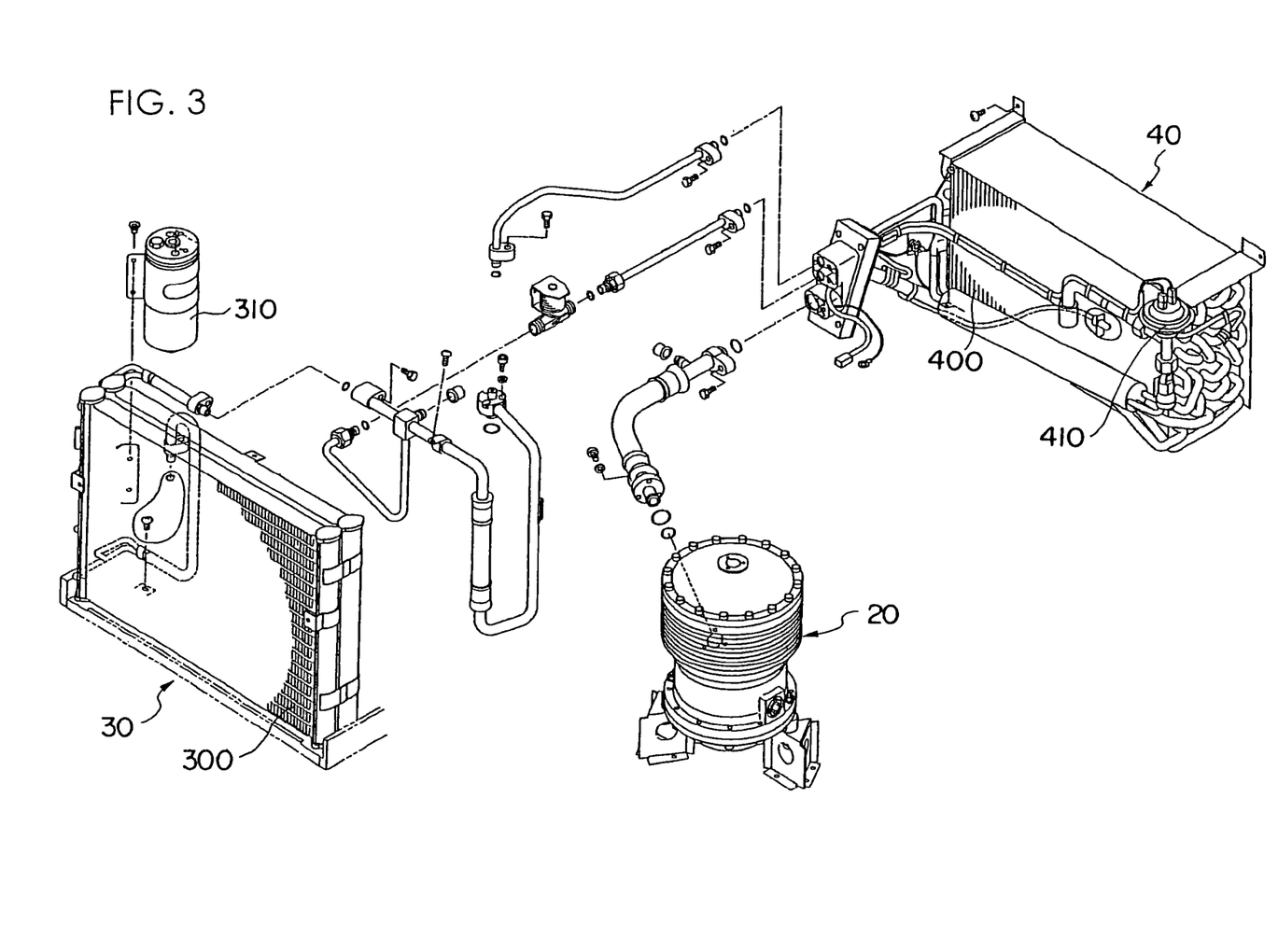
FIG. 3 is an explanatory view of a refrigeration cycle unit of the air chiller unit according to the present invention.

FIGS. 2 and 3 are explanatory views showing the exterior of the air chiller unit according to the present invention and the general structure of the refrigeration cycle unit.

An air chiller unit referred to as a whole by reference number 1 is equipped with a casing 10, a compressor 20 for a refrigerant disposed within the casing 10, a condenser 30, an evaporator 40 and a blower device 60 for blowing air.

As illustrated in FIG. 3, the refrigeration cycle unit of the air chiller unit is equipped with a compressor 20 driven by a motor, for compressing the refrigerant and sending out the same toward the condenser 30. The condenser 30 is equipped with a heat exchanger 300 for exchanging the gaseous refrigerant to a liquid-phase refrigerant. The liquid-phase refrigerant is stored in a receiver drier 310 disposed adjacent to the heat exchanger. The liquid-phase refrigerant in the receiver drier 310 is sent via a piping to an evaporator 40 disposed within the air cooling chamber defined by the wall of the casing 10. The liquid-phase refrigerant travels through an expansion valve 410 equipped to the evaporator 40 and sent to a heat exchanger 400 of the evaporator. The refrigerant is then evaporated in the heat exchanger 400 and cools the air passing through the heat exchanger 400.

The expansion valve 410 changes the opening of the valve according to the pressure and temperature of the refrigerant returning toward the compressor 20 from the evaporator 40, to thereby control the flow rate of the refrigerant being sent to the evaporator.

The blower device 60 has two fans mounted on both ends of a shaft of a motor, and blows air toward the condenser 30 and also blows the cooled air generated in the air cooling chamber toward the service carts placed in the passenger cabin.

Figure 4:
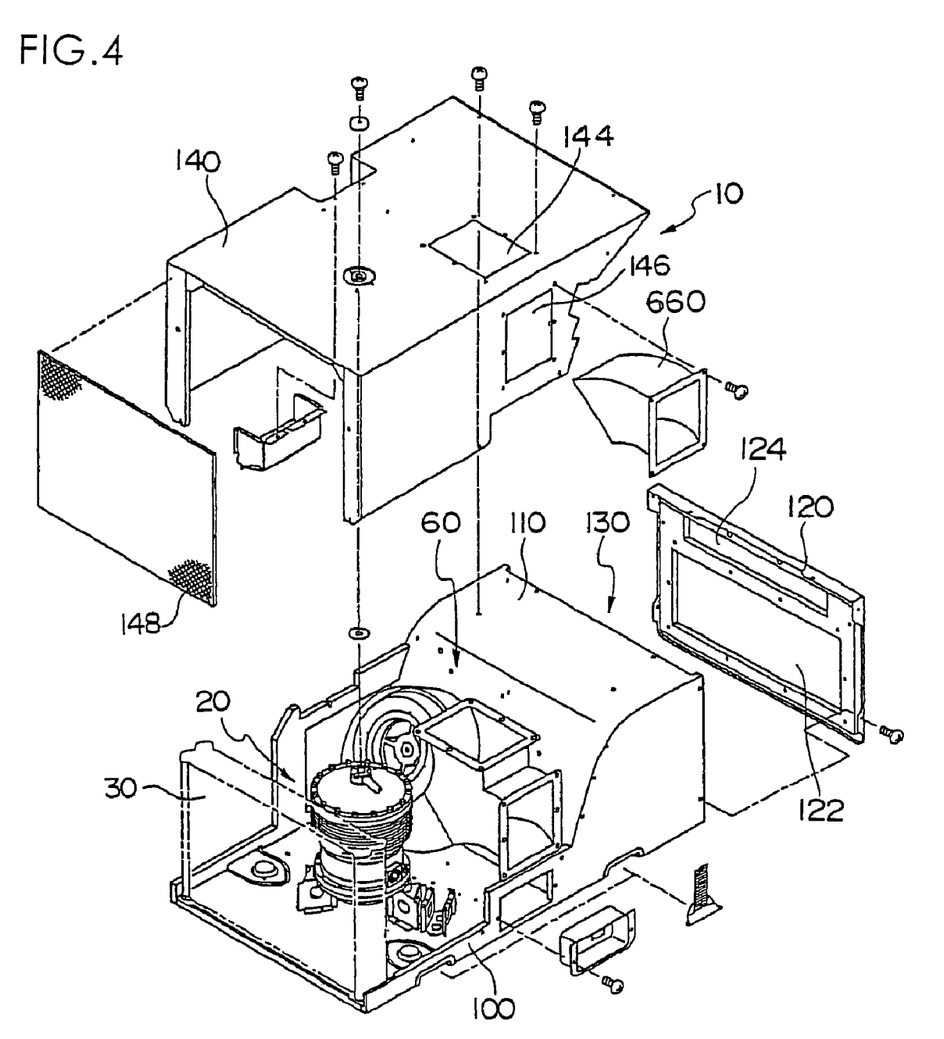
FIG. 4 is an explanatory view showing the structure of a casing of the air chiller unit according to the present invention.
Figure 5:
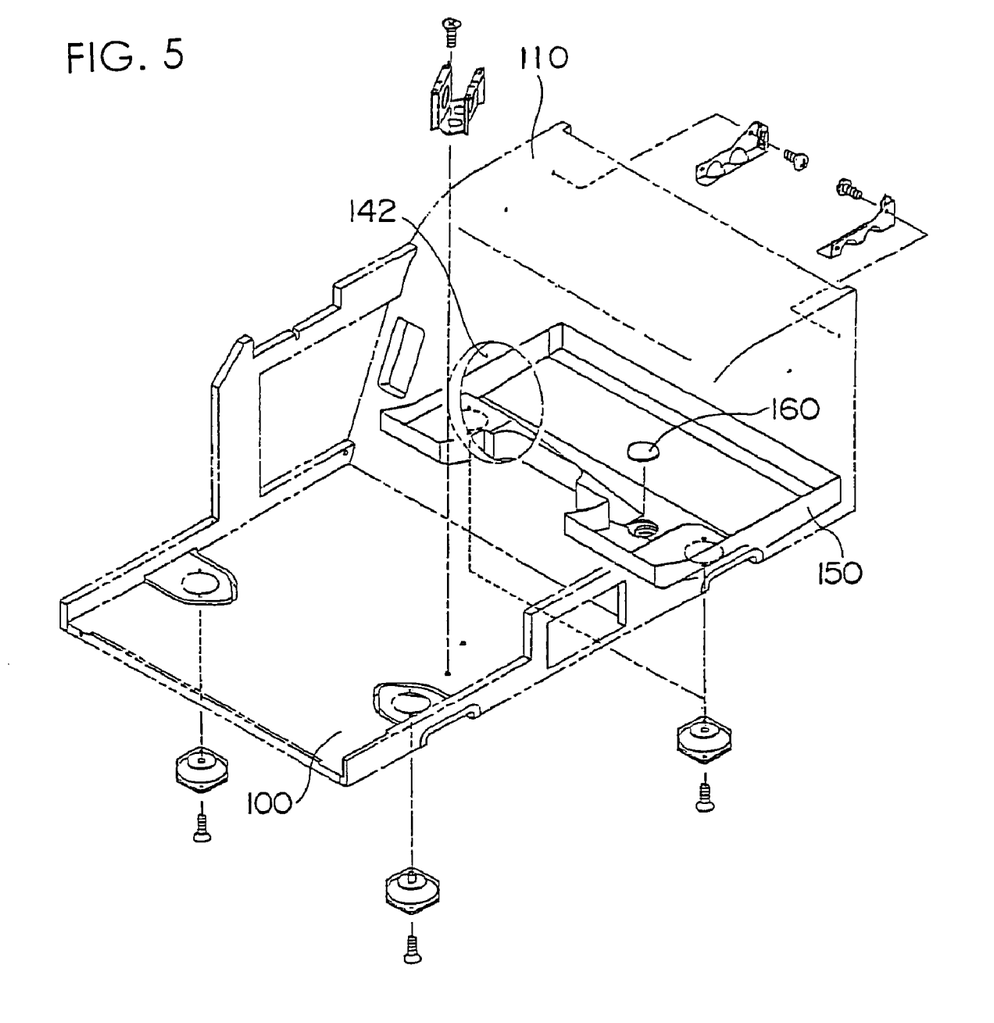
FIG. 5 is an explanatory view showing the structure of a casing of the air chiller unit according to the present invention.

FIGS. 4 and 5 are explanatory views showing the structure of a casing of the air chiller unit according to the present invention.

The casing 10 comprises a base plate 100, and on the base plate 100 are mounted devices such as the compressor 20.

The base plate 100 is formed of a honeycomb panel manufactured by sandwiching a core member having a honeycomb structure between two parallel plate members.

The honeycomb panel is lightweight and has superior flexural rigidity, so the base plate 100 is capable of supporting devices such as the compressor 20 by itself.

Since the honeycomb panel is formed to have air sealed in the honeycomb core, it has high heat insulating property. Therefore, it is suitable for forming the air cooling chamber or the like.

A partition member 110 formed of a honeycomb panel is disposed on the base plate 100. This partition member 110 is for dividing the air chiller unit into a side having the condenser and a side having the evaporator, and on this partition member 110 is mounted the blower device 60.

The partition member constitutes a portion of the air cooling chamber 130. A lid member 120 is mounted on the opening of the partition member 110.

The lid member 120 connected to a duct device 5 is equipped with a first opening 122 and a second opening 124. The first opening 122 is connected to a passage for sending the cool air returning from the galley to the air cooling chamber 130, and the second opening 124 is connected to a passage for sending the freshly cooled air cooled in the air cooling chamber 130 toward the galley.

A cover member 140 is mounted above the base plate 100, by which the compressor 20 and the blower device 60 are covered. The cover member 140 has rectangular openings 144 and 146 on the upper surface and side surface thereof. The openings 144 and 146 are used as exhaust outlets of air having cooled the condenser 30 and the compressor 20.

A mesh member 148 is attached to the end of the cover member 140, by which the front face of the condenser 30 is covered.

As illustrated in FIG. 5, a round hole 142 for the blower device is provided to the partition member 110. Further, a drain pan 150 for receiving water drops condensed on the evaporator is attached to the bottom of the air cooling chamber. The drain pan 150 is equipped with a drain valve 160.

Figure 6:
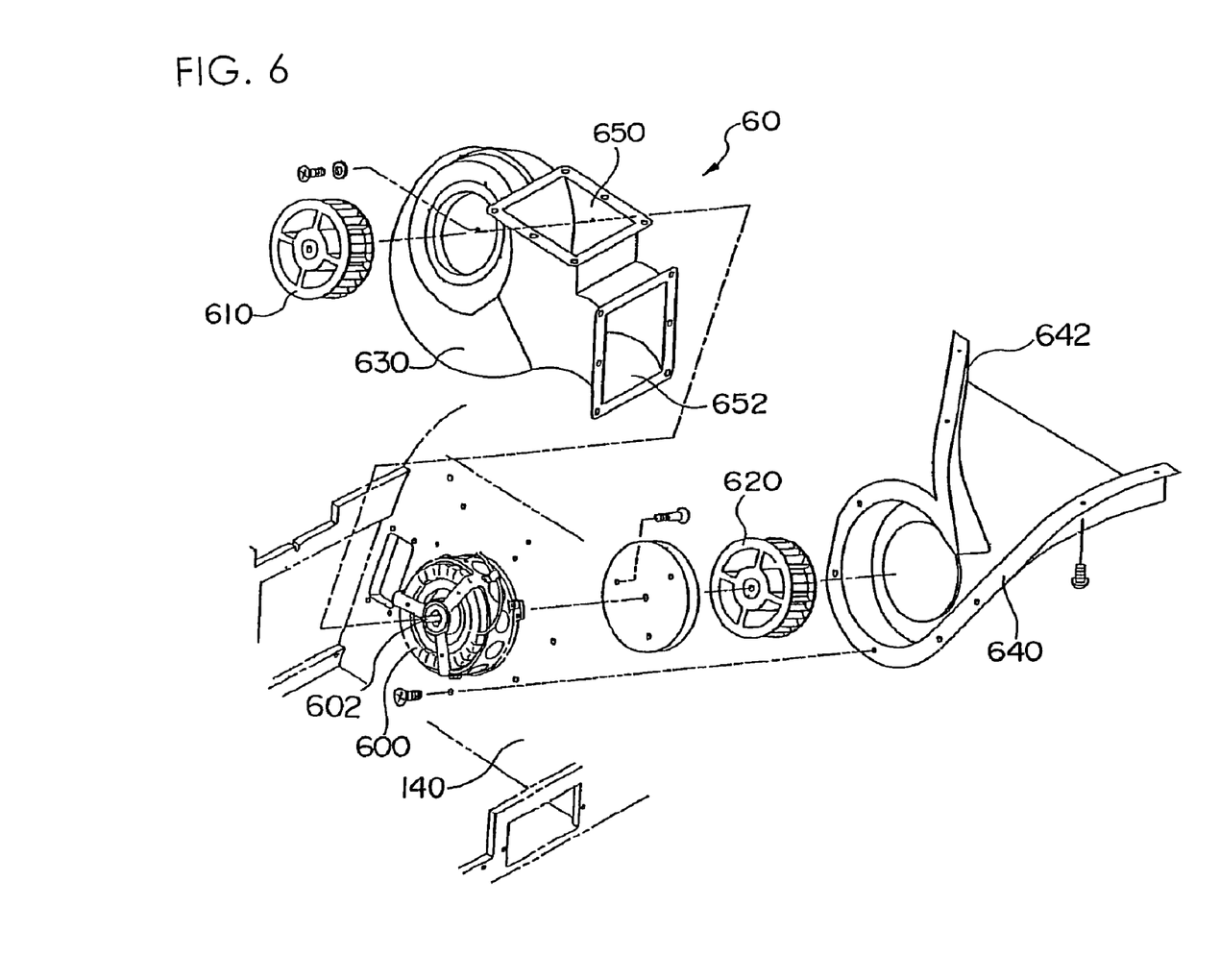
FIG. 6 is an explanatory view of a blower device of the air chiller unit according to the present invention.

FIG. 6 is an explanatory view showing the structure of the blower device 60.

The blower device 60 has a housing 630 constituting a passage for sending out cooled air, and a motor 600 disposed within the housing 630. The motor 600 has a drive shaft 602 whose both ends protrude therefrom, and on both ends of the driving shaft are fixed a first fan 610 and a second fan 620.

The first fan 610 is for sending the air for cooling the side having the condenser 30. The second fan 620 is for blowing the air cooled in the air cooling chamber toward the galley. The opening of the housing 630 is covered with a cover 640.

An opening portion 642 of the cover 640 is connected to the second opening 124 of the lid member 120 for sending the freshly cooled air toward the galley.

Figure 7:
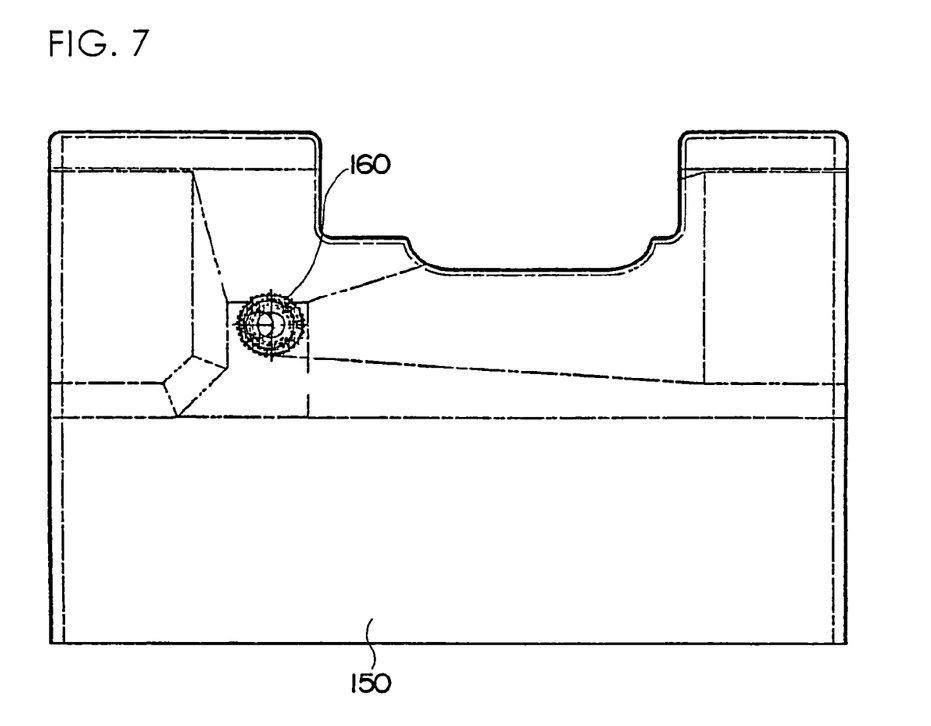
FIG. 7 is a plan view of a drain pan of the air chiller unit according to the present invention.
Figure 8:
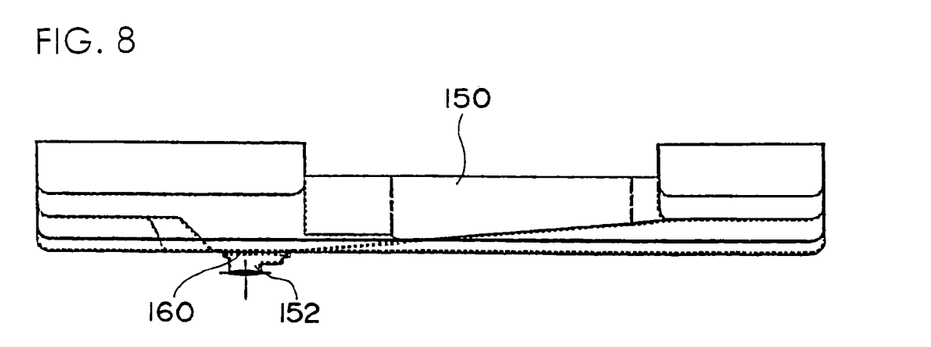
FIG. 8 is a front view of a drain pan of the air chiller unit according to the present invention.

FIG. 7 is a plan view of the drain pan 150 for receiving dewdrops from the evaporator, and FIG. 8 is a front view thereof.

The drain pan 150 has a drain 152 opening to the bottom portion thereof, and a drain valve 160 attached to the upper portion of the drain 152.

Figure 9A:
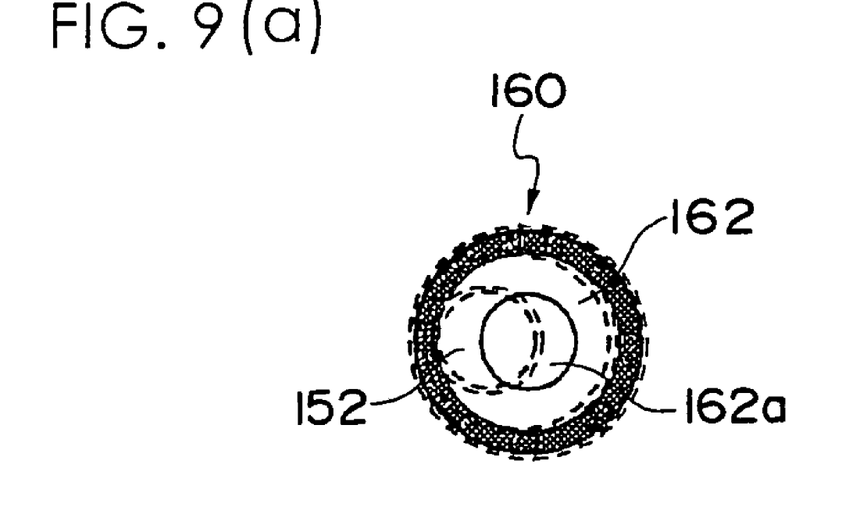
FIG. 9 is an explanatory view of the drain valve.
Figure 9B:
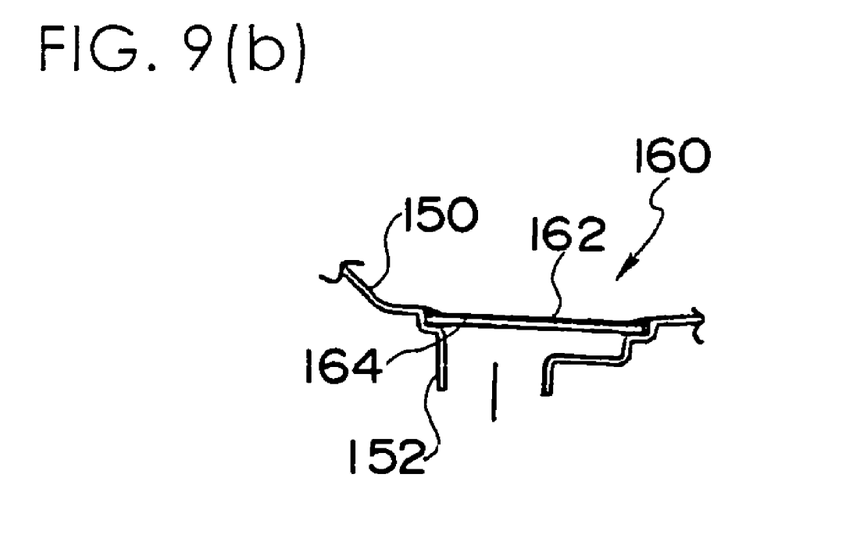

FIG. 9 shows a plan view and a cross-sectional view of the drain valve 160.

The drain valve 160 is composed of a ring-shaped valve seat member 162 made from a metal plate, and a valve member 164 gripped by the valve seat member.

Figure 10A:
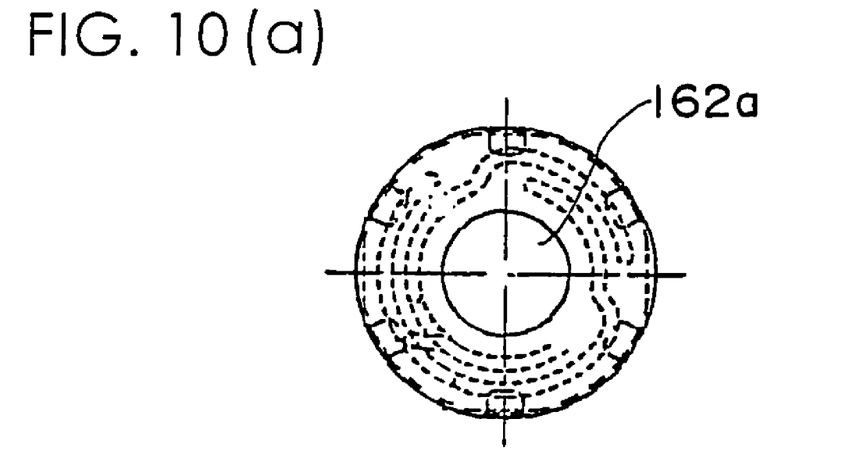
FIG. 10 is an explanatory view of the drain valve.
Figure 10B:
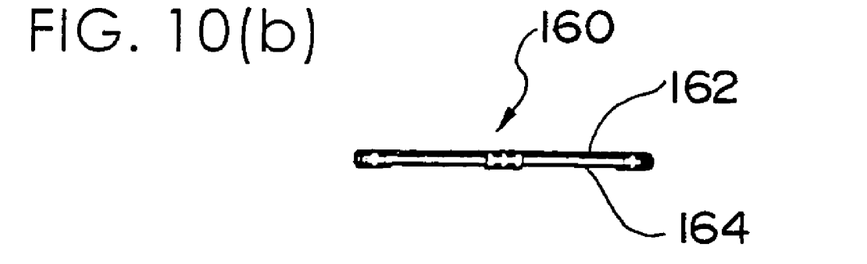
Figure 10C:
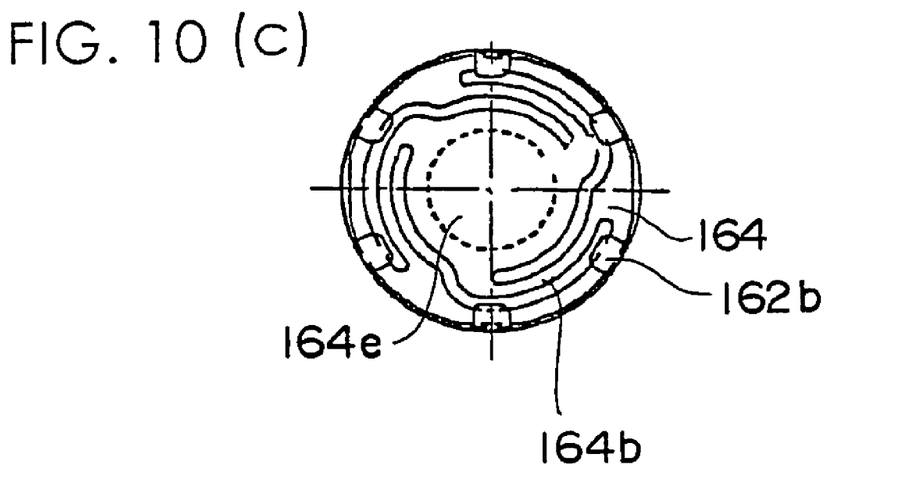

FIG. 10 shows the structure of a drain valve 160. The valve seat member 162 has a round opening 162a formed to the center thereof, and a bent portion 162b formed to the outer circumference thereof for gripping the valve member 164.

Figure 11:
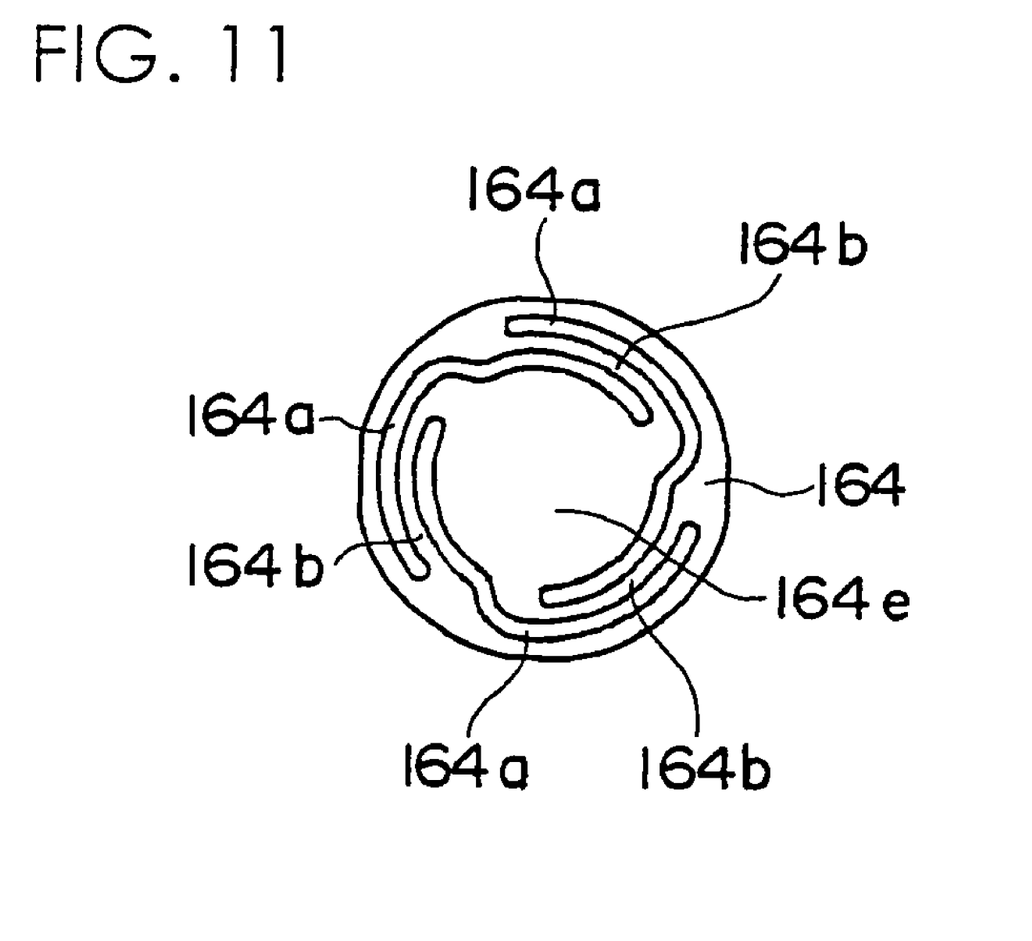
FIG. 11 is a plan view of the valve member.

FIG. 11 shows the plan shape of the valve member 164. The valve member 164 is formed by creating three slits 164a on a thin silicon rubber disk. Three arms 164b defined by the three slits 164a support the valve means 164e at the center portion.

The valve means 164e is elastically supported with small spring constant by the very flexible arms 164b formed of thin silicon rubber.

Next, the function of the drain valve is explained.

While the air chiller unit is operating, the blower device 60 sends the cooled air within the air cooling chamber 130 toward the galley, so the interior of the air cooling chamber 130 becomes negative pressure. Upon receiving this negative pressure, the valve means 164e of the valve member 164 in the drain valve 160 is sucked toward the valve seat member 162 and shuts the opening 162a of the valve seat member 162.

By this action, the drain valve 160 is shut, preventing highly moist outside air from entering the device and also preventing noise generated in the air chiller unit from leaking to the exterior.

When the highly moist outside air enters the air cooing chamber 130, frost occurs on the surface of the evaporator, deteriorating the cooling effect. In order to remove this frost, it is necessary to perform a so-called frost removal cycle in which high-temperature refrigerant is sent into the evaporator. By preventing outside air from entering, the frequency for performing this frost removal cycle can be reduced.

When the operation of the fan in the air chiller unit is stopped and the dew condensed on the evaporator drips into the drain pan 150 reaching the drain valve 160, the gravitational force of the water drops causes the valve means 164e of the valve member 164 to move away from the opening 162a of the valve seat member 162, opening the drain valve.

By this operation, the water drops in the drain pan are discharged through the drain 152.

When the water on the valve means 164e are gone, the valve means returns to the position shutting the opening 162a of the valve seat member 162, preventing outside moist from entering.

When the operation of the air chiller unit is restarted, the drain valve is closed at once, preventing highly moist outside air from entering and noise from leaking to the exterior.

What is claimed is:

1. An air chiller unit mounted on an aircraft for supplying cooled air to a storage portion for storing food and the like, the air chiller unit comprising:

a refrigeration cycle unit;

a casing for storing the refrigeration cycle unit;

a drain pan for receiving dew condensation formed on an evaporator of the refrigeration cycle unit; and a drain valve attached to a drain of the drain pan, wherein the drain valve comprises a ring-shaped valve seat member having an opening formed in the center portion, and a valve member disposed below the valve seat member for opening and closing the opening of the valve seat member;

wherein the valve member is provided with a plurality of slits.

2. The air chiller unit according to claim 1, wherein the valve member is made of a thin silicon rubber member, and a valve means for opening and closing the opening of the valve seat member is designed to contact the opening of the valve seat member with a spring constant.

* * * * *